United States Patent
Lustenberger (10) Patent No.: US 11,885,696 B2
(45) Date of Patent: Jan. 30, 2024

(54) VIBRATING WIRE SENSOR AND VIBRATING WIRE FOR A VIBRATING WIRE SENSOR

(71) Applicant: DIGI SENS Holding AG, Freiburg (CH)

(72) Inventor: Martin Lustenberger, Villars sur Glane (CH)

(73) Assignee: Digi Sens Holding AG, Freiburg (CH)

( * ) Notice: Subject to any disclaimer, the term of this patent is extended or adjusted under 35 U.S.C. 154(b) by 862 days.

(21) Appl. No.: 16/484,984

(22) PCT Filed: Feb. 12, 2018

(86) PCT No.: PCT/CH2018/050007
§ 371 (c)(1),
(2) Date: Aug. 9, 2019

(87) PCT Pub. No.: WO2018/148852
PCT Pub. Date: Aug. 23, 2018

(65) Prior Publication Data
US 2020/0025633 A1    Jan. 23, 2020

(30) Foreign Application Priority Data

Feb. 15, 2017    (CH) .......................... 175/17

(51) Int. Cl.
*G01L 1/16* (2006.01)
*G01L 1/10* (2006.01)
(Continued)

(52) U.S. Cl.
CPC .............. *G01L 1/162* (2013.01); *G01L 1/106* (2013.01); *G01L 5/04* (2013.01); *H10N 30/00* (2023.02)

(58) Field of Classification Search
CPC . G01L 1/162; G01L 1/10; G01L 1/106; G01L 5/04; G01N 3/02; H01L 41/08;
(Continued)

(56) References Cited

U.S. PATENT DOCUMENTS

| 4,656,383 A | 4/1987 | Albert |
| 4,710,668 A * | 12/1987 | Fima ........................ H03H 9/17 310/321 |

(Continued)

FOREIGN PATENT DOCUMENTS

| CN | 203595494 U | 5/2014 | |
| DE | 2534096 A1 | 2/1977 | |
| EP | 2407765 A1 | 1/2012 | |
| FR | 2802299 A1 * | 6/2001 | ............... G01B 7/16 |
| JP | 2000-214005 A | 8/2000 | |
| JP | 2002090384 A * | 3/2002 | |
| JP | 3503213 * | 3/2004 | ........... B06B 1/0651 |

(Continued)

OTHER PUBLICATIONS

Ridha, Philipp, International Search Report for PCT/CH2018/050007 (dated May 28, 2018) (3 pages).

*Primary Examiner* — Octavia Davis Hollington
(74) *Attorney, Agent, or Firm* — Henry Patent Law Firm PLLC (57) ABSTRACT

The invention relates to a vibrating wire sensor (20, 30, 40 and 50) having a vibrating wire (21, 31, 41 and 51), which is tensioned accordingly differently under measurement conditions of a current factor to be detected, and having an exciter arrangement for exciting the vibrating wire (21, 31, 41 and 51) in the range of the respective natural frequency thereof, wherein the exciter arrangement has at least one exciter layer (22, 32, 42 and 52) provided on a longitudinal portion of the vibrating wire (21, 31, 41 and 51), having a piezoelectric activation layer (33, 46 and 54), which has a different length depending on the activation state, and thus creates a correspondingly different vibration position of the vibrating wire (21, 31, 41 and 51). A vibrating wire sensor can thus be designed to be more robust, wherein the power consumption is additionally considerably less. The invention (Continued)

further relates to a vibrating wire having an exciter layer (22, 32, 42 and 52), which has a piezoelectric activation layer.

14 Claims, 7 Drawing Sheets

(51) Int. Cl.
*G01L 5/04* (2006.01)
*H10N 30/00* (2023.01)

(58) Field of Classification Search
CPC ........ H01L 41/09; G01H 13/00; H02N 2/185; H02N 2/103
USPC ...................................................... 73/514.34
See application file for complete search history.

(56) References Cited

U.S. PATENT DOCUMENTS

| | | |
|---|---|---|
| 2012/0000288 A1 | 1/2012 | Matsuura et al. |
| 2012/0192649 A1 | 8/2012 | Strehlow et al. |
| 2016/0005951 A1* | 1/2016 | Yoshida ............... H04R 17/005 310/354 |

FOREIGN PATENT DOCUMENTS

| | | | | |
|---|---|---|---|---|
| JP | 2008211863 A | * | 9/2008 | |
| JP | 2009-265056 A | | 11/2009 | |
| JP | 2015021951 | | 2/2015 | |
| WO | WO-2006009220 A1 | * | 1/2006 | ........... B06B 1/0651 |

* cited by examiner

VIBRATING WIRE SENSOR AND VIBRATING WIRE FOR A VIBRATING WIRE SENSOR

The present invention relates to a vibrating wire sensor and a vibrating wire for a vibrating wire sensor according to the preamble of claims 1 and 10.

Vibrating wire sensors are known and used in numerous applications, frequently (but by no means exclusively) to measure an actual quantity such as deformations or forces. The term deformation is understood in the present case as the elastic or also plastic deformation of machine elements during operation. Such deformation can be relevant for monitoring the safe operating state in metal structures of any kind or also in non-metallic structures such as building or bridges. Furthermore, a load currently acting during operation can be detected by means of deformation sensors, for example, for the control of a movement. This deformation is detected by the vibrating wire sensor thus acting as a deformation/force sensor, for example, via the displacement between measurement points, wherein a force thereby acts on the sensor which is a measure for the deformation. The sensor according to the invention can also be used as a pure force sensor, for example, in a balance.

Vibrating wire sensors can be configured in such a manner that they detect extremely small deformations or force variations in a finely resolved manner and in addition barely have any drift over time—in this respect vibrating wire sensors are frequently qualitatively superior to load cells or strain gauges.

Figure 1:
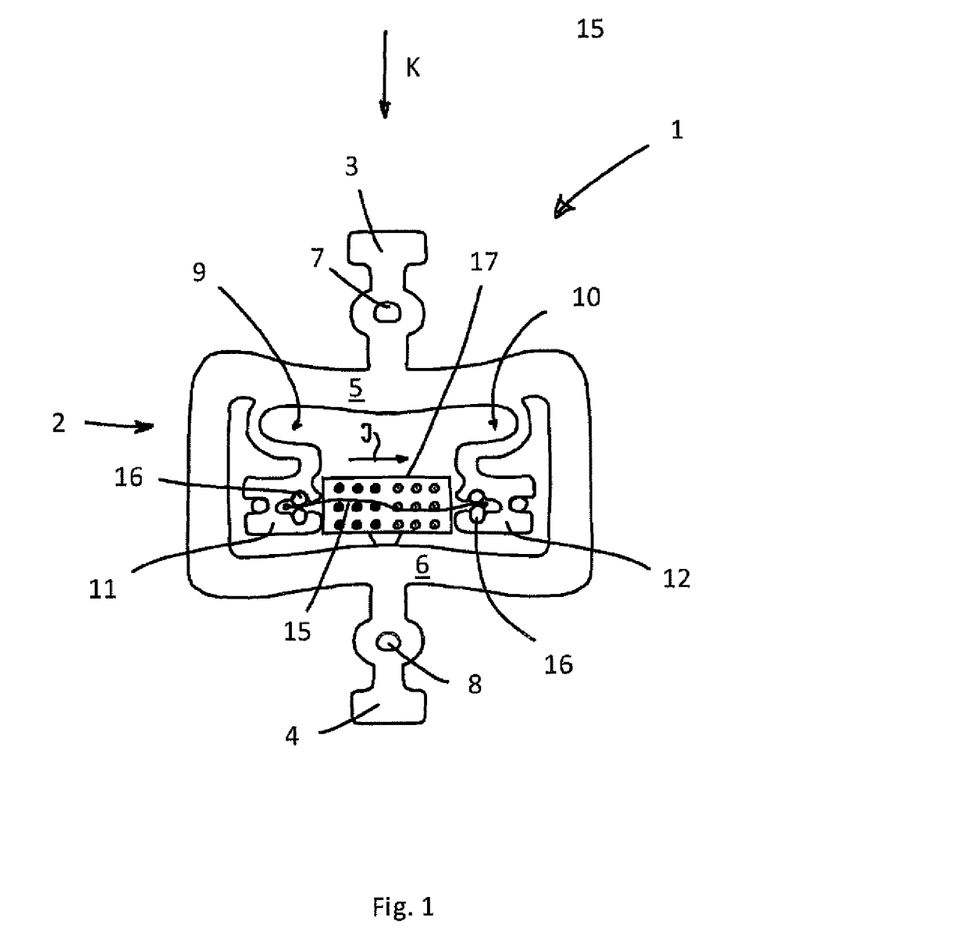
FIG. 1 shows a vibrating wire sensor according to the prior art.

One embodiment of such a vibrating wire sensor has become known from CN 203 595 494 U and is shown in FIG. 1.

A vibrating wire sensor 1 in operation can be seen, i.e. under measurement conditions, having a frame 2 which is configured to be rectangular here, having fixing elements 3, 4 which act on transverse members 5, 6 of the frame 2, and which for their part are fixed by means of their fastening points 7, 8 to a component, not shown so as not to overburden the figure, the deformation of which is to be measured or, for example, a component of a balance in which the weight to be weighed is to be determined (a fixing can be accomplished via a simple screw connection or by a simple clamping of any kind). Under the measurement conditions, here in the case of a deformation of the component or a force which occurs and which is to be measured, the sensor 1 experiences a force, for example, in the direction of the arrow K (or the opposite direction thereof), whereby its frame 2 becomes elastically deformed in the action of the force, which in turn results in a deflection of the transmission lever 9, 10, on the heads 11, 12 of which a vibrating wire 15 is clamped with the aid of clamping pins 16. Since the transmission levers are also deformed elastically, a distance-force translation is obtained from the fastening points 7, 8 to the heads 11, 12 or clamping pins 16 so that the vibrating wire 15 is subjected to varying tensile stress according to the deformation which is actually present or the force to be measured, wherein naturally in the rest position of the sensor, i.e. without any effect of the surroundings on the fastening points 7, 8 the vibrating wire 15 is tensioned in a predetermined manner. The heads 11, 12 with the clamping pins 16 form clamping points for the vibrating wire 15.

Further apparent is an arrangement 17 which generates a magnetic field during operation, whose field lines are perpendicular to the plane of the drawing and in the left half of the arrangement 17 are directed away from the observer and in the right half, are directed towards the observer. To this end, during operation an alternating current I flows through the vibrating wire 15 which is generated by an electronics system which is again omitted so as not to overload the figure. Thus, the Lorentz force corresponding to the alternating current I acts on the vibrating wire, which makes this vibrate at the frequency of the alternating current, wherein with a suitable change in frequency the vibrating wire rapidly drops into its natural frequency which in turn depends on the tension acting on it, i.e. on the displacement of the measurement points 7, 8 as a consequence of a deformation or action of force. The electronics system can detect the natural frequency and generate from this a sensor signal for the deformation/action of force.

FIG. 1 shows in summary form a vibrating wire sensor having a vibrating wire which is tensioned accordingly differently under measurement conditions of a current quantity to be detected and having an exciter arrangement for exciting a vibrating wire in the range of its natural frequency.

Such vibrating wire sensors have the disadvantage that their power consumption is really high or that during coarse handling, the magnets can be moved out of their correct position or the expenditure for the impact-free fastening is high. High power consumption plays a role, for example, when a bridge is provided with deformation sensors whose batteries must be continuously changed or alternatively must be wired.

The object of the present invention is to improve vibrating wire sensors.

In order to solve this object, a vibrating wire sensor according to the invention has the characterizing features of claim 1 and a vibrating wire according to the invention has the characterizing features of claim 11.

Since the vibrating wire of a vibrating wire sensor has a piezoelectric activation layer, the power consumption can be reduced considerably compared with conventional designs. In addition, magnets or other elements for generating a magnetic field are omitted and thus the elements which are decisive for the sensitivity of the sensor during rough treatment. Finally a vibrating wire sensor according to the invention has a compact structure.

Since the piezoelectric activation layer has a different length according to the activation state, a deformation of the vibrating wire over its length is obtained in the manner of a bimetal spring which is suitable to produce vibrations in a string.

Embodiments of the vibrating wire sensor or the vibrating wire according to the invention have features according to the dependent claims.

The invention is described in detail with reference to the figures.

In the figures:

FIG. 5b shows a view of the vibrating wire from FIG. 5a.

Figure 2A:
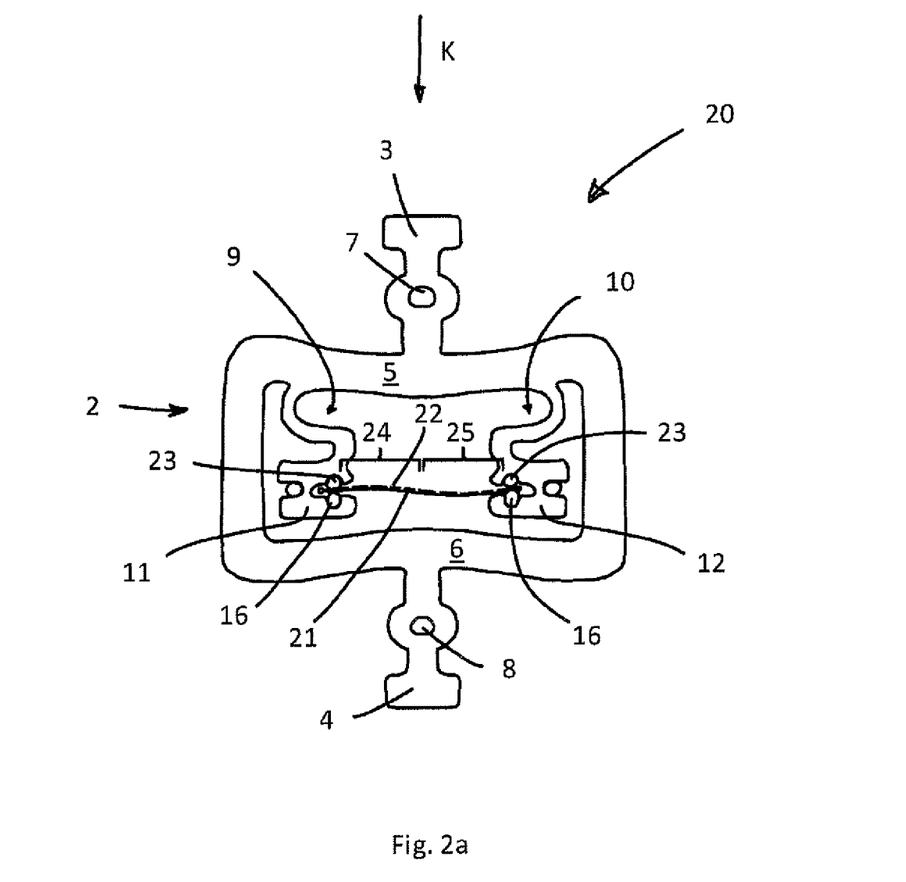
FIG. 2*a* shows an embodiment of a vibrating wire sensor according to the invention.

FIG. 2a shows the principle of the present invention by means of a preferred embodiment of a vibrating wire sensor 20. The vibrating wire sensor 20 shown in operation can (but need not) have the same basic structure as the vibrating wire sensor 1 from FIG. 1. However, the arrangement 17 (FIG. 1) for generating a magnetic field is absent. A vibrating wire 21 can be seen, which is covered at least over a length portion, here over its entire length, by an exciter layer 22 indicated by the dashed line, which comprises a piezoelectric activation layer. Possible embodiments of the exciter layer 22 are described in detail in the figures.

An alternating voltage is applied to the exciter layer 22 via clamping pins 23 or contact elements. The alternating voltage is generated by an electronics system of the vibrating wire sensor 20 which is omitted so as not to overburden the figure. The figure shows an operating state in which as a result of the applied alternating voltage, the piezoelectric activation layer of the exciter layer 22 in the left-hand portion 24 has an activation state in which it is lengthened and in the right-hand portion 25 has an activation state in which it is shortened.

As a result, the vibrating wire 21 curves in the manner of a bimetal spring, when viewed from left to right, towards the right in portion 24, towards the left in portion 25. This curvature corresponds to a vibration position of the vibrating wire with a vibration node in the centre (vibration frequencies above the audible threshold are desirable).

Figure 2B:
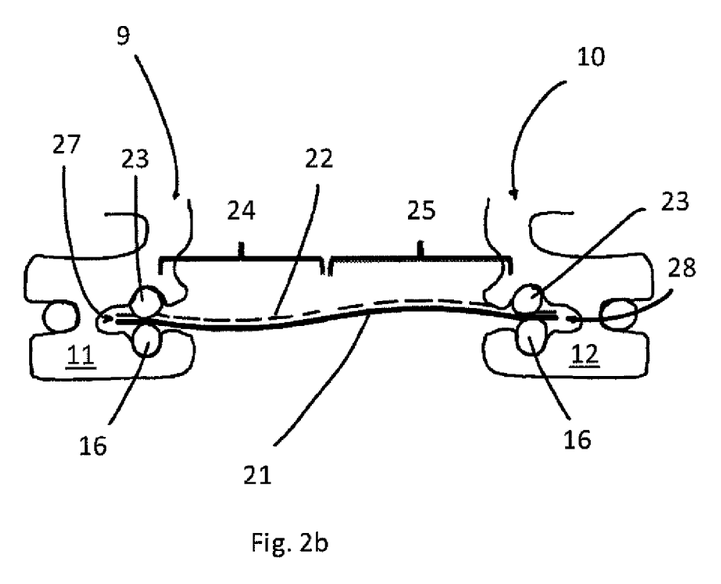
FIG. 2*b* shows an enlarged section from FIG. 2*a* with the vibrating wire.

FIG. 2b shows in enlarged view a section of the vibrating wire sensor 20 in the region of the vibrating wire 21, which, compared with the diagram from FIG. 2a however, has a different vibration position corresponding to that a half-wave later than the alternating voltage active at the clamping pins 23. The exciter layer 22 in the left-hand portion 24 is shortened and lengthened in the right-hand portion 25 so that the vibrating wire 21 is curved to the left in the portion 24 and curved to the right in the portion 25.

The vibrating wire 21 vibrates according to the applied alternating voltage, excited by the different activation states of the exciter layer 22, to and fro between the vibration positions shown in FIGS. 2a and 2b, wherein the frequency of the alternating voltage is varied by the electronics system until the vibrating wire 21 vibrates in its current natural frequency. The current natural frequency is determined by the current voltage of the vibrating wire 21, given by the clamping pins 16, 23 which apply tensile stress to the vibrating wire 21 according to the displacement of the measurement points 7, 8 (FIG. 1). As mentioned above, the electronics system generates a signal on the basis of the current natural frequency, which corresponds to the deformation or force to be detected by the sensor 20.

It is found that the exciter arrangement of a vibrating wire sensor according to the invention has at least one exciter layer provided on a longitudinal portion of the vibrating wire with a piezoelectric activation layer which has a different length according to the activation state and thus brings about an accordingly different vibration position of the vibrating wire.

A vibrating wire is further obtained according to the invention which has a piezoelectric exciter layer provided on at least one longitudinal portion, which has a different length according to the activation state and thereby brings about a deformation of the vibrating wire over at least one longitudinal portion.

In an alternative embodiment, the alternating voltage can be applied to the end portions 27, 28 of the vibrating wire 21. It is thus possible to provide an arbitrary suitable material for the clamping pins (or clamping or holding elements of any kind). Corresponding conductors which lead from the end portions 27, 28 to the electronics system of the vibrating wire sensor 20 are omitted so as not to overburden the figure.

The vibrating wire 21 is preferably configured to be thin and flat in cross-section, for example, rectangular (but can also be approximately oval or round) and has a low moment of inertia in the vibration plane—the vibrating wire is flexible, therefore in the deflected position has scarcely any spring-elastic restoring force given by the bending, with the result that it vibrates from a deflected position substantially due to the tension exerted via the clamping points back into its stretched position. This back-vibration can naturally be substantially assisted by the correspondingly clocked piezoelectric activation layer of the exciter layer 22.

The following figures show various embodiments of a vibrating wire detector with a vibrating wire according to the invention.

Figure 3:
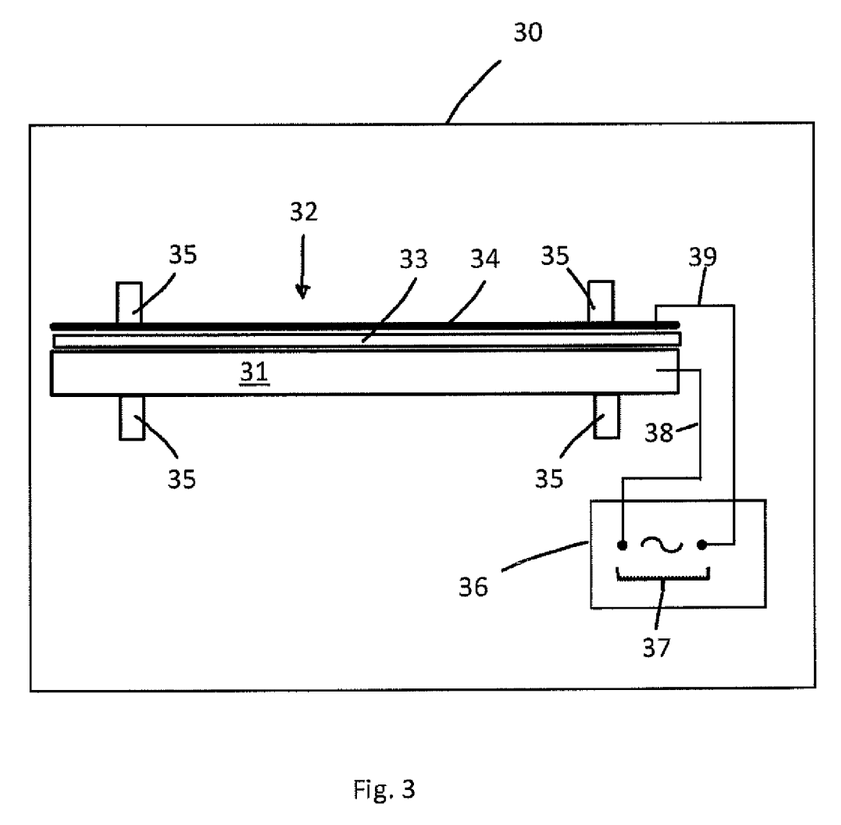
FIG. 3 shows in schematic view an embodiment of a vibrating wire according to the invention in a vibrating wire sensor.

FIG. 3 shows a vibrating wire sensor 30, schematically indicated by a rectangle, which can be configured, for example, as the vibrating wire sensor 1 from FIG. 1 apart from the components shown in FIG. 3. The vibrating wire sensor 30 comprises a vibrating wire 31, with an excited layer 32 which comprises a piezoelectric activation layer as well as an electrode 34, which extends over the length of the activation layer 33. The vibrating wire 31 is clamped in clamps 35 which are preferably configured as clamping pins (FIG. 1) but can also be configured differently. A schematically depicted electronics system 36 of the vibrating wire sensor has a voltage source 37 which is connected via a conductor 38 to the vibrating wire 31 and is connected via a conductor 39 to the electrode 34. The remaining components of the vibrating wire sensor are omitted in order not to overburden the figure, in particular heads 11, 12 (FIG. 1) in which the clamps 35 are arranged. The figure shows for better representation as a result of distorted proportions, the vibrating wire 31 is in reality long and thin, e.g. 0.4 mm wide, 0.3 mm thick and 20 mm long. The exciter layer 32 is thin, according to the method of manufacture, see below.

The vibrating wire 31 preferably consists of a beryllium-bronze alloy, which is very hard, barely lengthens under tension and does not creep, i.e. contributes to the precise, drift-proof operation of the vibrating wire sensor.

The piezoelectric activation layer 33 is preferably configured as an AlScN layer with scandium in the range of 15% to 30%. However, it can also consist of pure AlN. The electrode can be implemented as a thin layer of gold.

Further preferably the activation layer 33 is applied to the vibrating wire 31 by sputtering, likewise the electrode. Preferably, after sputtering the activation layer 33 is heated above the Curie temperature, polarized by a suitable E field and then cooled, so that it becomes piezoelectrically activatable. It is also possible to polarize the piezolayer directly during sputtering. The sputtering process also results in a manifestation of the crystal orientation or specific crystal types which can facilitate the subsequent polarization in certain orientations. The person skilled in the art is familiar with vibrating wires of the said type as well as piezoelectric coatings of AlScN which can be produced by sputtering.

The electronics system 36 is configured as mentioned above to deliver an alternating voltage during operation, for example, with a starting frequency which is close to the natural frequency of the vibrating wire 31 in the rest state of the vibrating wire sensor 30. The frequency is then increased until the vibrating wire 31 falls into its natural frequency which in turn can be identified by the electronics system from its impedance, at the natural frequency the apparent resistance z of the electrode—piezoelectric activation layer—electrode arrangement is minimal (this arrangement forms a capacitance). As mentioned, the natural frequency is a measure for the tension acting on the vibrating wire 31 which in turn is a measure for the deformation or force to be detected so that the electronic system 36 can generate a signal of the detected current quantity (deformation, force) from the detected current natural frequency of the vibrating wire 31.

It is found that the exciter layer 32 has electrodes 34, 31 which encompass the activation layer between them and wherein the vibrating wire 31 forms one of the electrodes. In this case, the vibrating wire can be coated with gold on the side of the piezoelectric activation layer 33 for its part to improve its conductivity.

Figure 4:
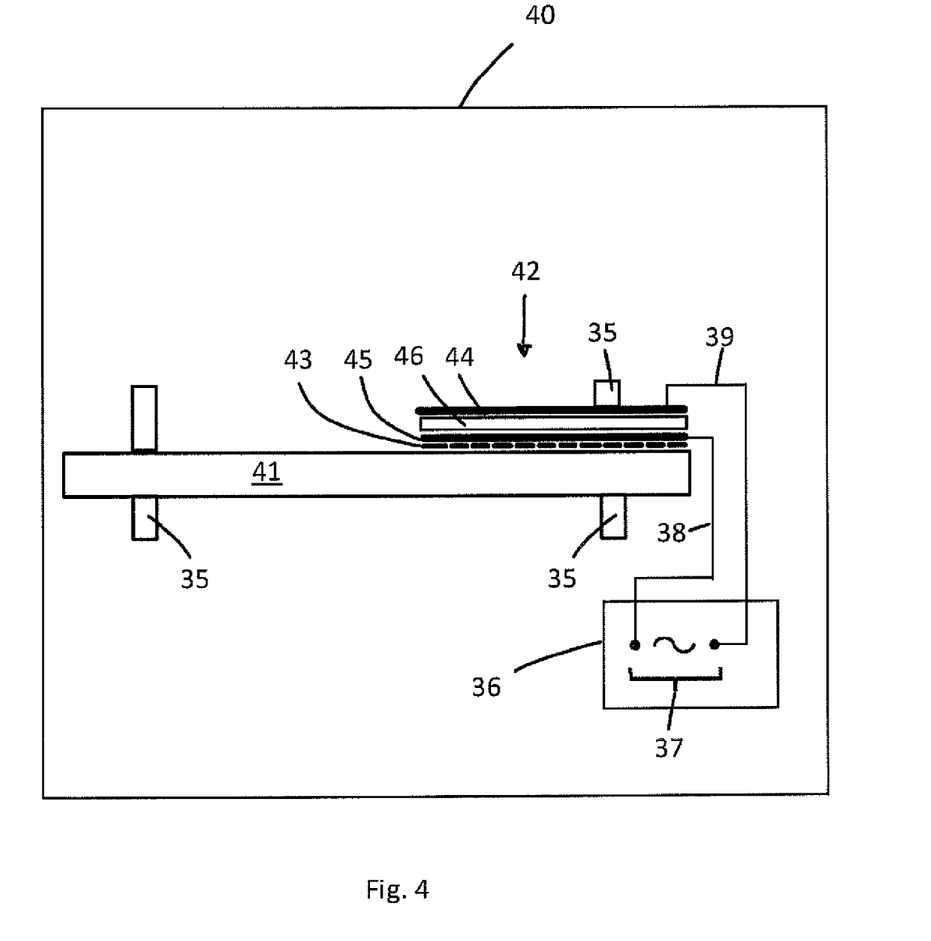
FIG. 4 shows in schematic view another embodiment of a vibrating wire according to the invention in a vibrating wire sensor.

FIG. 4 shows a vibrating wire sensor 40 with a further embodiment of a vibrating wire 41, which is only provided with an exciter layer 42 over a longitudinal portion. In addition, the exciter layer 42 is electrically insulated with respect to the vibrating wire 41 by an insulation layer 43 shown by the dashed line in the figure, for example made of $Al_2O_3$, aluminium oxide or ZnO, zinc oxide. In addition to an upper electrode 44, a lower (i.e. arranged on the vibrating wire 41) electrode 45 is provided, the voltage source 37 of the electronics system 36 is connected via the conductor 38 to the lower electrode 45 and via the conductor 39 to the upper electrode 44. The piezoelectric activation layer 46 is surrounded by electrodes 44, 45 over its length.

The arrangement shown makes it possible to avoid a current flow through the vibrating wire 41 which has a high Ohmic resistance as a result of its alloy (little longitudinal extension and low creep, see above). Thus, only comparatively low Ohmic resistances are present in the alternating voltage circuit. In addition, the energy requirement of the exciter layer 42 is fundamentally low and particularly markedly low at the natural frequency of the vibrating wire 41. A power consumption of 30% to 20% is obtained compared with a conventional vibrating wire sensor 1 (FIG. 1).

It is found that an electrode is arranged on the inner side of the exciter layer, which extends over substantially the length of the exciter layer.

The arrangement shown allow the vibrating wire to be excited to a vibration with a vibration node.

As in the embodiment shown in FIG. 3, an electrode 34 or 44, 45 extends from the vibrating portion of the vibrating wire 31 or 41 through the corresponding clamping point given by the location of the clamps 35. This allows this electrode to be connected particularly simply to an assigned conductor 38, 39 since the region behind the clamping points is more easily accessible for connection to electrodes 34, 44, 45 and the vibrating wire 31, 41 can be broadened there for suitable connection.

Starting from the embodiment shown in the figure with an exciter layer which is provided on the right-hand side of the vibrating wire 41, a second exciter layer preferably having the same structure can be provided on the left-hand side of the vibrating wire 41, which further preferably is arranged on the opposite side thereof. Then two exciter layers are provided which are located on different sides of the vibrating wire, which allows the developing vibration of the vibrating wire to be triggered particularly precisely during operation and lead towards the current natural frequency of the vibrating wire.

This results in a vibrating wire in which two exciter layers are provided which are arranged on the same side or on different sides of the vibrating wire.

Figure 5A:
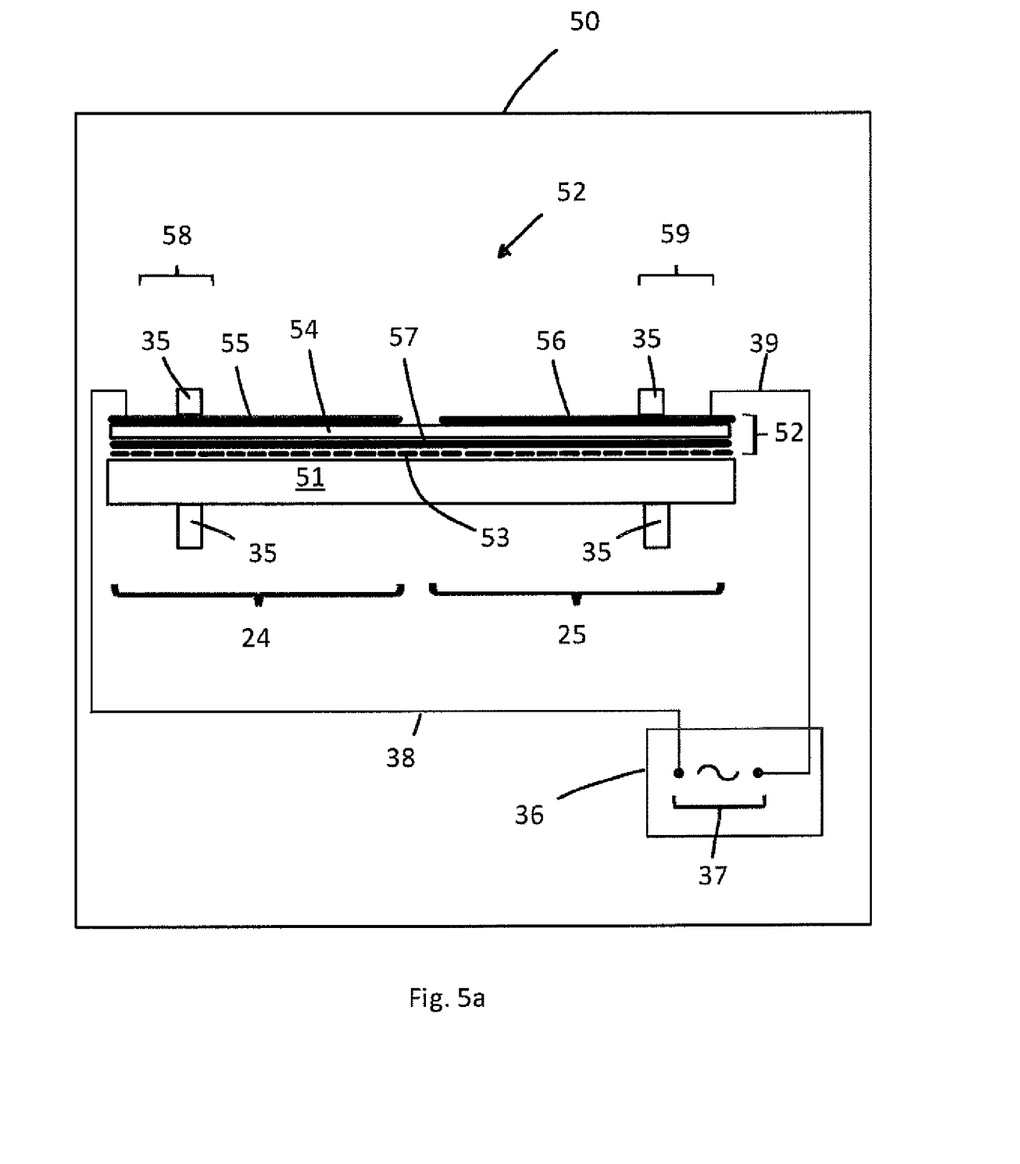
FIG. 5a shows in schematic view a preferred embodiment of a vibrating wire according to the invention in a vibrating wire sensor.

FIG. 5a shows a preferred embodiment of the present invention with a vibrating wire sensor 50 again shown only schematically, having a vibrating wire 51 which is clamped therein by means of clamps 35. An exciter layer 52 extends substantially over the entire length of the vibrating wire 51, is insulated from this by an insulation layer 53 again indicated by a dashed line and has a continuous piezoelectric activation layer 54 which is encompassed by outer electrodes 55, 56 and an inner electrode 57.

The two outer electrodes 55, 56 are separate from one another, wherein the one electrode 55, 56 is connected to the conductor 38 of the voltage source 37 and the other electrode 56, 55 is connected to the conductor 39. One of these conductors 38, 39 is switched as a neutral conductor, the other conductor 39, 38 as voltage-carrying conductor, i.e. phase.

This arrangement corresponds to two series-connected capacitors: if, for example, the conductor 39 is switched as voltage-carrying conductor, during operation an alternately E field is obtained between the upper electrode 56 and the lower electrode 57, which activates once the interposed right-hand portion 25 (see on this matter, e.g. FIG. 2b) of the piezoelectric activation layer 54, which depending on the direction of the E-field and the polarization of the piezoelectric activation layer 54 results in a thickness variation and therefore also in a length variation of this portion and therefore in a curvature of the vibrating wire 51 in the right-hand portion 25.

With the formation of this E field in the right-hand portion 25, a charge shift is obtained in the lower electrode 57 which is thus charged in the left-hand portion 24 in the opposite direction to its right-hand portion 25 which in turn together with the outer electrode 55 results in an E field in the left-hand portion 24, which is oppositely directed to the E field in the right-hand portion 25. The length variation in the portion 24 is therefore opposite to that of the portion 25, therefore also the curvature of the vibrating wire 51 which gives a vibration position with a vibration node in the centre of the vibrating wire 51.

In the next half-wave of the applied alternating voltage the vibrating wire 51 is inversely curved, therefore adopts a correspondingly different vibration position. Its natural frequency is detected by the electronics system 36 again from a minimum of the apparent resistance z.

Figure 5B:
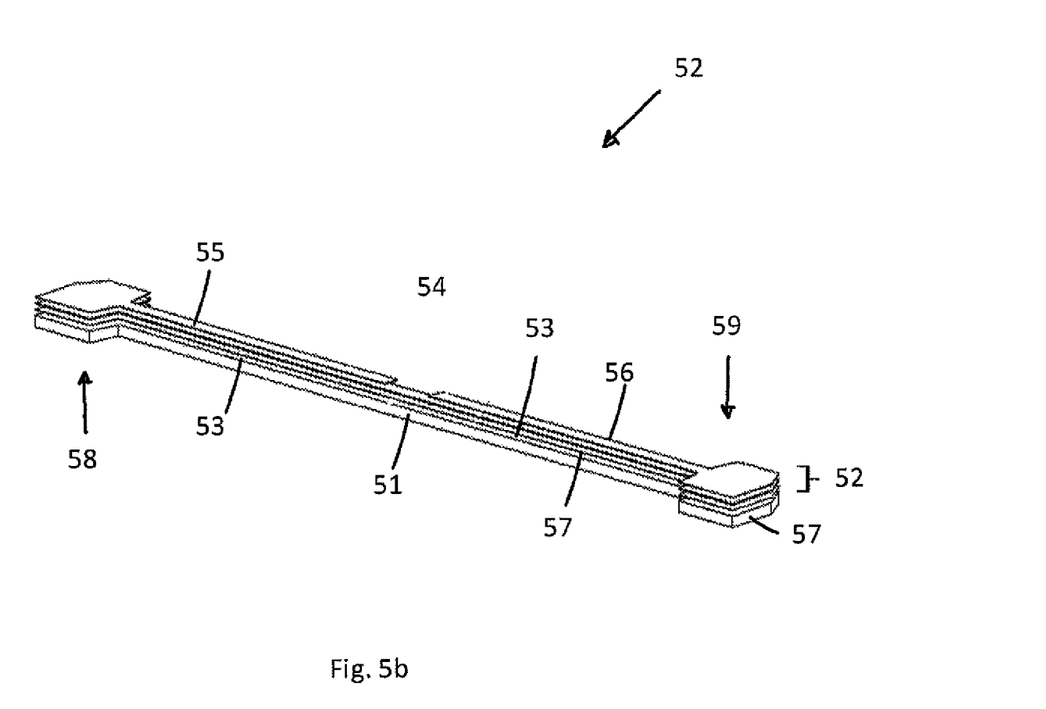

FIG. 5b shows a three-dimensional view of the vibrating wire 51 from FIG. 5a in the manner of an exploded drawing with real proportions. The end regions 58, 59 are broadened, which improves the clamping at the ends.

The arrangement according to FIGS. 5a and 5b is particularly advantageous since the vibrating wire can be excited by a simple structure (particularly by the same polarization of the piezoelectric exciter layer over its length) over its entire length for the desired form of vibration with a vibration node.

A vibrating wire sensor according to the invention is obtained in which the exciter layer extends from one clamping region 58, 59 of the vibrating wire 51 to the other clamping region 59, 58 and two electrodes 55, 56 are provided which extend on the same side of the exciter layer 52 from the opposite clamping regions 58, 59 towards one another as far as the centre of the exciter layer 52 and wherein a continuous electrode 53 between the clamping regions 58, 59 is provided on the opposite side of the exciter layer 52. Preferably as shown in FIGS. 5a and 5b, the continuous electrode 53 is located on the inner side of the exciter layer 52. Further preferably one of the outer electrodes 55, 56 is connected to a voltage-carrying conductor of an alternating voltage source and the other outer electrode is connected to a neutral conductor.

Further preferably an electrode 56, 57 is provided on an outer side of the piezoelectric activation layer 54, which extends at least over a longitudinal portion of the exciter layer 52.

The correspondingly preferably configured vibrating wire is provided with an exciter layer 52 which has one electrode 57 continuously on one side thereof and two electrodes 55, 56 on the opposite side thereof, which extend starting from the end regions 58, 59 as far as towards the centre of the vibrating wire 52.

In an embodiment not shown in the figures but similar to that according to FIGS. 5a, 5b, the piezoelectric activation layer is not continuous but interrupted in the centre of the vibrating wire so that, for example, the voltage-carrying conductor can be connected to the lower continuous electrode.

In the specific case, the person skilled in the art can suitably combine the various features according to the exemplary embodiments presented above.

The invention claimed is:

1. A vibrating wire sensor comprising:
a vibrating wire which is accordingly tensioned differently under measurement conditions of a current quantity to be detected and comprising an exciter arrangement for exciting the vibrating wire in a range of a respective natural frequency thereof, wherein the vibrating wire is constructed of an alloy and is operatively clamped at its ends by heads of transmission levers of a frame of the vibrating wire sensor, and wherein the exciter arrangement has at least one exciter layer with a piezoelectric activation layer provided on a longitudinal portion of the vibrating wire which has a different length depending on an activation state and thereby brings about a correspondingly different vibration position of the vibrating wire.

2. The vibrating wire sensor according to claim 1, wherein the exciter layer comprises electrodes which encase the piezoelectric activation layer between them and wherein the vibrating wire forms one of the electrodes.

3. The vibrating wire sensor according to claim 1, wherein the exciter layer is electrically insulated with respect to the vibrating wire.

4. The vibrating wire sensor according to claim 1, wherein one electrode is provided on an outer side of the piezoelectric activation layer which extends at least over a longitudinal portion of the exciter.

5. The vibrating wire sensor according to claim 1, wherein one electrode extends from a vibrating portion of the vibrating wire through a clamping point.

6. The vibrating wire sensor according to claim 1, wherein one electrode is arranged on an inner side of the exciter layer which extends over substantially a length of the exciter layer.

7. The vibrating wire sensor according to claim 1, wherein two exciter layers are provided which are located on different sides of the vibrating wire.

8. The vibrating wire sensor according to claim 7, wherein a continuous electrode is located on an inner side of the exciter layer.

9. The vibrating wire according to claim 8, wherein the exciter layer is electrically insulated with respect to the vibrating wire.

10. The vibrating wire sensor according to claim 7, wherein one outer electrode is connected to a voltage-carrying conductor and another outer electrode is connected to a neutral conductor of an alternating voltage source.

11. The vibrating wire sensor according to claim 1, wherein the exciter layer extends from a clamping region of the vibrating wire as far as another clamping region and two electrodes are provided which extend on a same side of the exciter layer from opposite clamping regions towards one another as far as the centre of the exciter layer, and wherein an electrode passing through the clamping regions is provided on the opposite side of the exciter layer.

12. A vibrating wire for a vibrating wire sensor according to claim 1, characterized in that the vibrating wire sensor comprises a piezoelectric exciter layer provided on at least one longitudinal portion, which has a different length depending on an activation state and thereby brings about a deformation of the vibrating wire over at least one longitudinal portion.

13. The vibrating wire according to claim 12, wherein the exciter layer comprises one electrode continuously on its one side and two electrodes on its opposite side, which extend starting from end regions far as towards a centre of the vibrating wire.

14. The vibrating wire according to claim 12, wherein two exciter layers are provided which are arranged on the same side or on different sides of the vibrating wire.

* * * * *

UNITED STATES PATENT AND TRADEMARK OFFICE
CERTIFICATE OF CORRECTION

| | |
|---|---|
| PATENT NO. | : 11,885,696 B2 |
| APPLICATION NO. | : 16/484984 |
| DATED | : January 30, 2024 |
| INVENTOR(S) | : Martin Lustenberger |

It is certified that error appears in the above-identified patent and that said Letters Patent is hereby corrected as shown below:

In the Specification

Column 7, Line 5, After "conductor." delete "¶"

Column 7, Line 15, Delete "52." and insert -- 51. -- therefor

In the Claims

Column 8, Claim 9, Line 18, after "wire" insert -- sensor -- therefor

Signed and Sealed this
Twenty-third Day of April, 2024

Katherine Kelly Vidal
*Director of the United States Patent and Trademark Office*